United States Patent [19]

Griesshaber

[11] 4,326,219

[45] Apr. 20, 1982

[54] DIGITAL ERROR MEASURING CIRCUIT FOR SHADING AND REGISTRATION ERRORS IN TELEVISION CAMERAS

[75] Inventor: Karl H. Griesshaber, San Jose, Calif.

[73] Assignee: Ampex Corporation, Redwood City, Calif.

[21] Appl. No.: 139,604

[22] Filed: Apr. 11, 1980

[51] Int. Cl.³ .............................................. H04N 9/62
[52] U.S. Cl. ..................................... 358/163; 358/10; 358/139
[58] Field of Search ...................... 358/10, 50, 51, 160, 358/163, 139, 21 R

[56] References Cited

U.S. PATENT DOCUMENTS 4,200,934  4/1980  Hofmann .............................. 358/163
4,234,890  11/1980  Astle et al. ........................... 358/163

Primary Examiner—Michael A. Masinick
Attorney, Agent, or Firm—George B. Almeida; Joel D. Talcott

[57] ABSTRACT

To provide measurement of horizontal and vertical spatial errors, as well as shading errors, the active video picture is divided horizontally into 13 equal blocks, and vertically into 14 bands of checkers. During the setup mode, the signal from a selected camera is fed to an A/D converter in the video signal path, and to sync and pattern validation circuits which provide control and timing signals and an electronic test pattern signal. Horizontal error measurement is provided via a horizontal adder/memory loop whereby selected samples within the blocks of successive horizontal lines are selectively summed to provide successive pairs of summed horizontal digital data. Vertical error measurement is done simultaneously by a vertical adder/memory circuit whereby selected adjacent samples of alternate checkers are selectively delayed and added, to provide successive pairs of summed vertical digital data. During a read cycle, the horizontal and vertical pairs of digital data are selectively subtracted to inherently cancel the effects of existing shading errors, blooming, crosstalk, etc., and the difference signals are D/A converted. The horizontal and vertical transition and zero crossing information is established, and the transitions information are compared with the electronic test pattern signal to derive the digital horizontal and vertical spatial error data for storage in a microprocessor memory. Shading error data are provided from the vertical adder/memory circuit and also are stored in the microprocessor memory. The stored error data are subsequently retrieved and used to provide spatial and shading correction during the camera operating mode.

18 Claims, 13 Drawing Figures

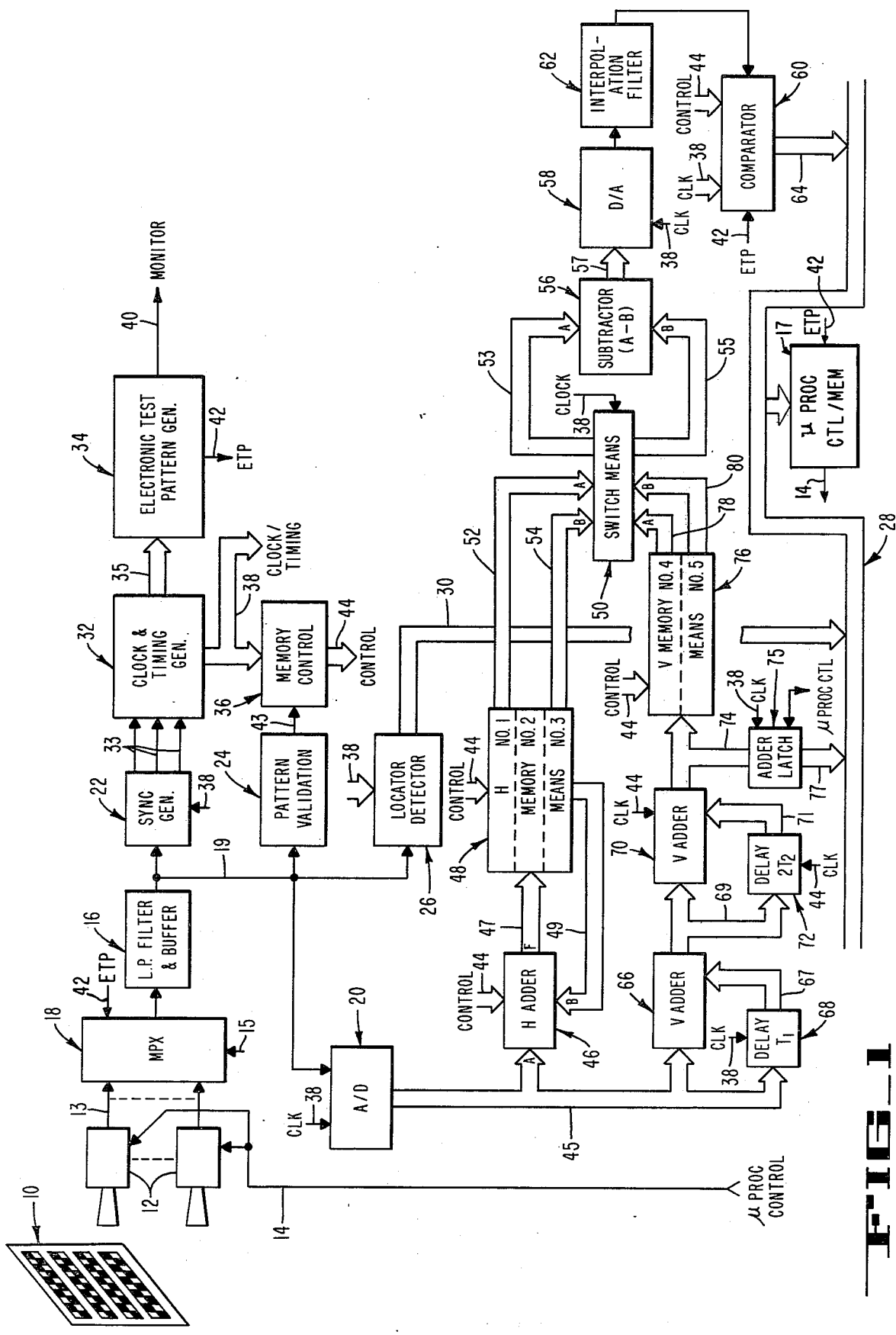

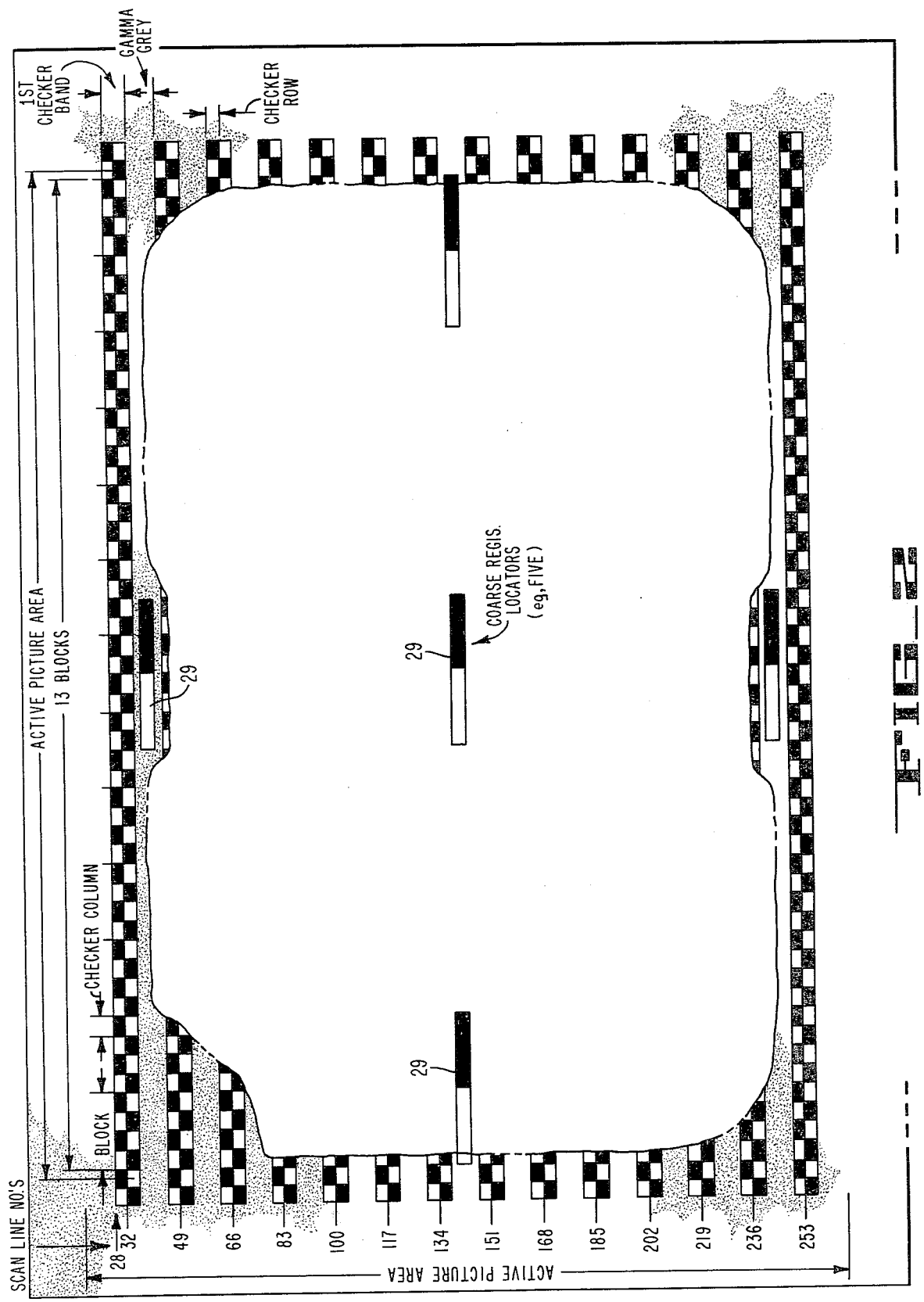
FIG_2

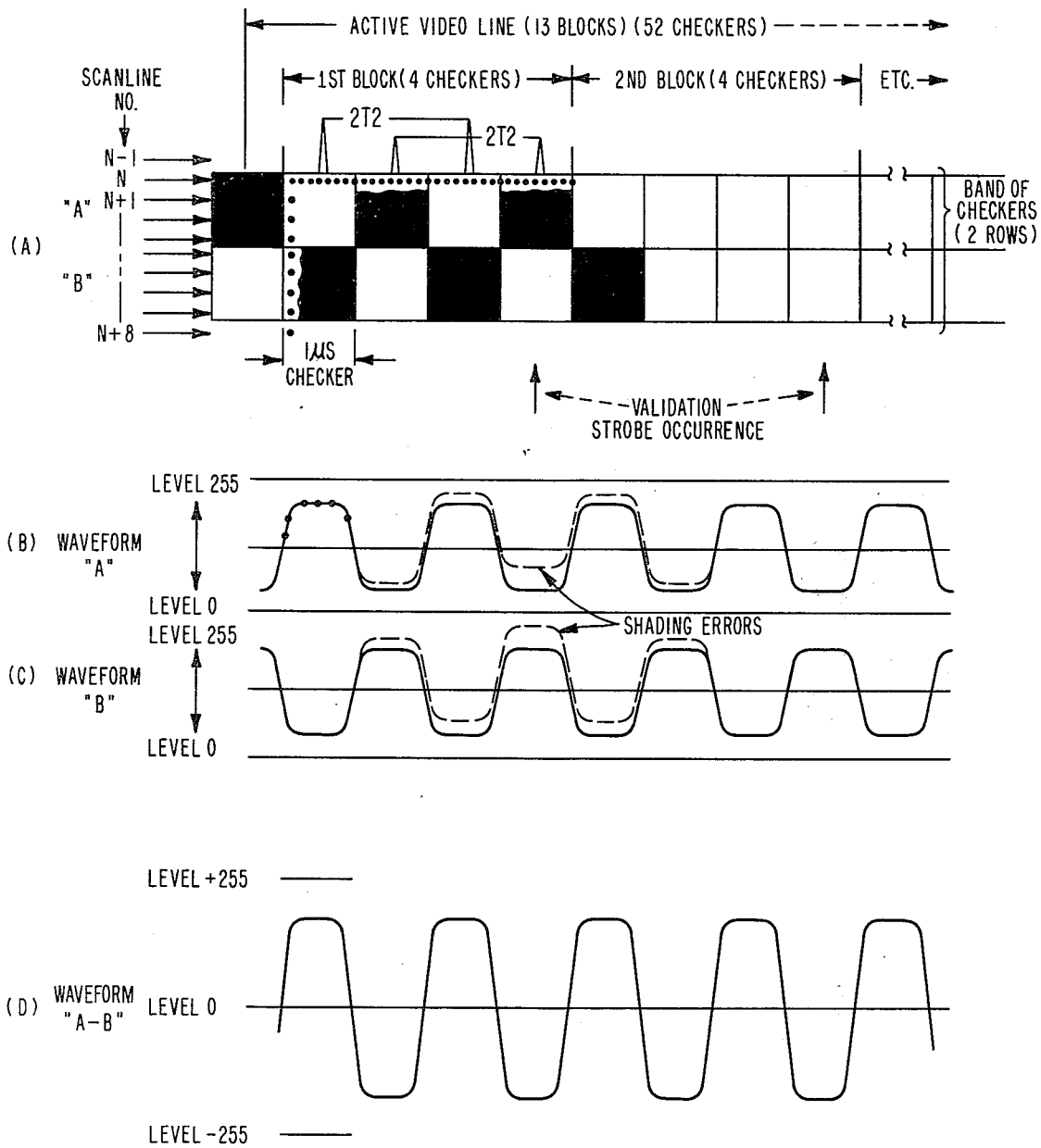
FIG_3

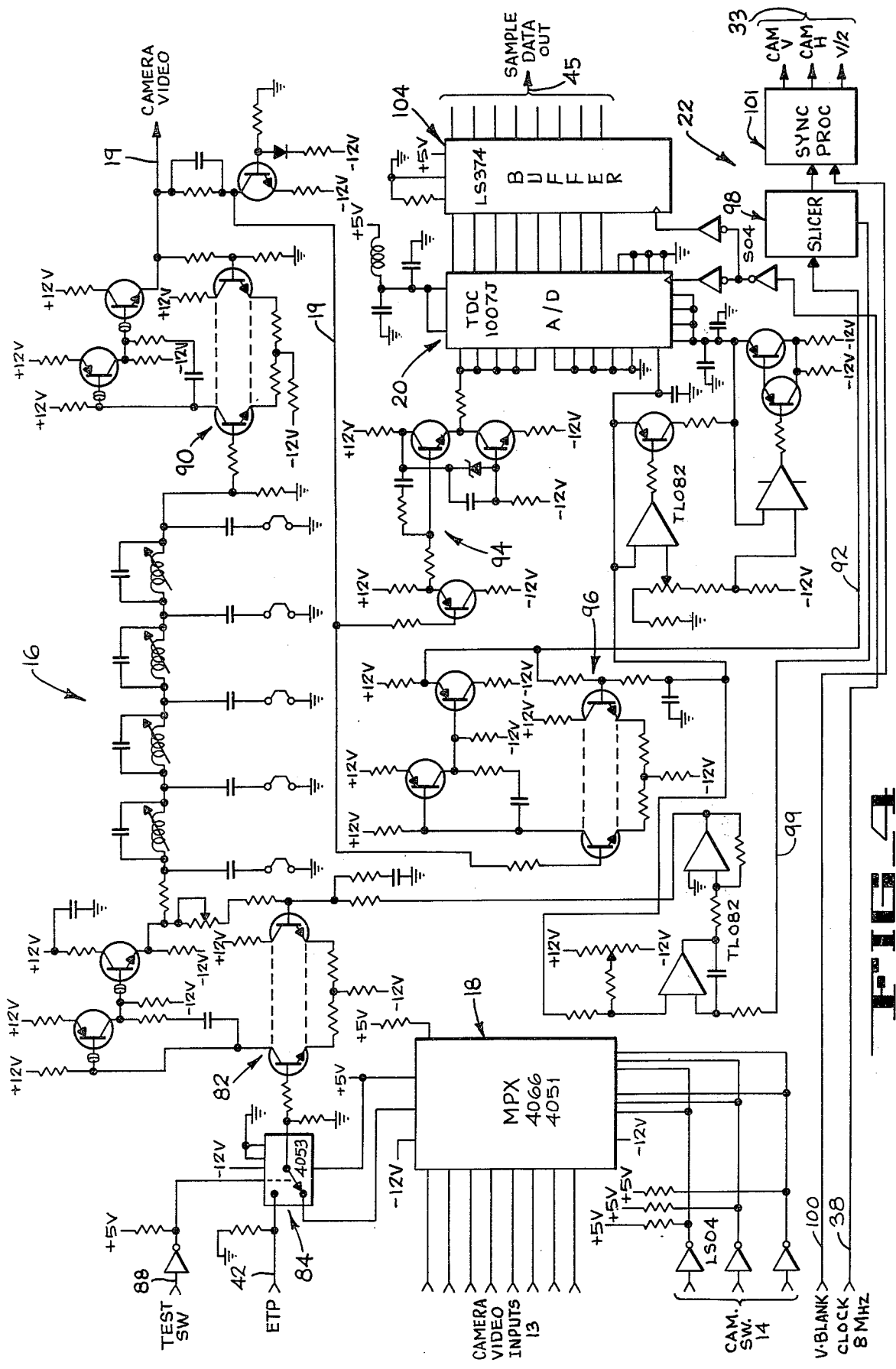

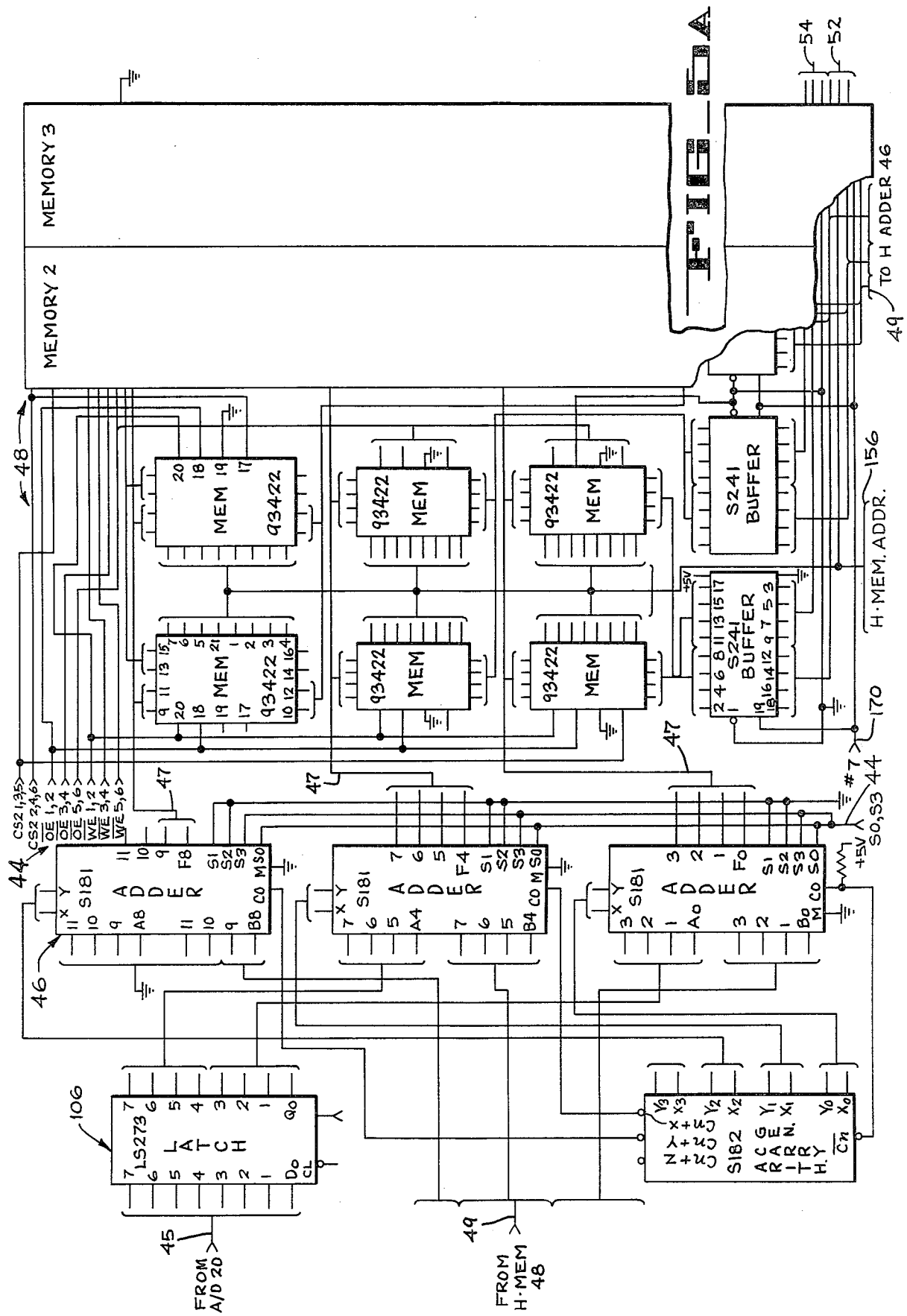

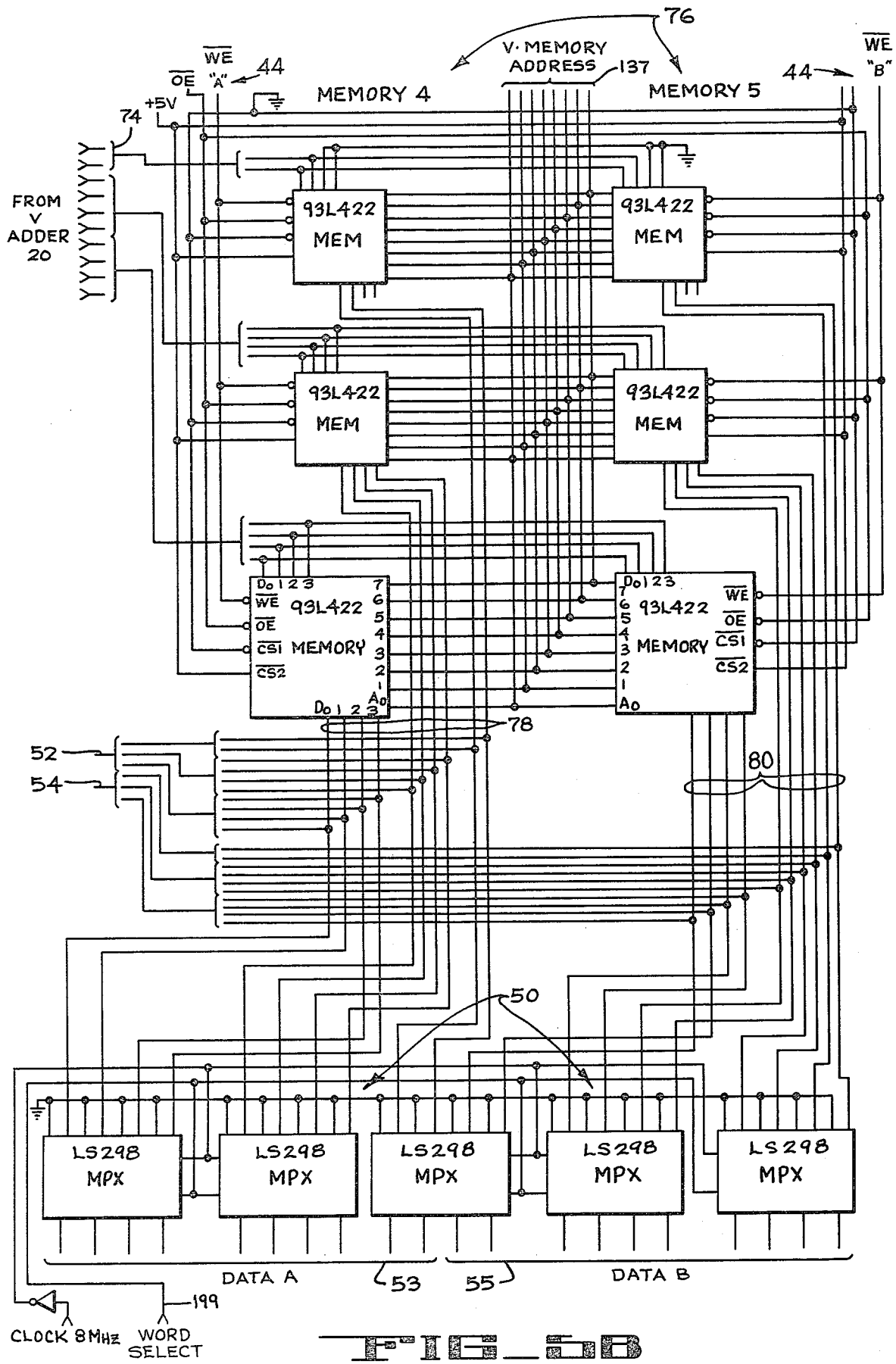
FIG_5B

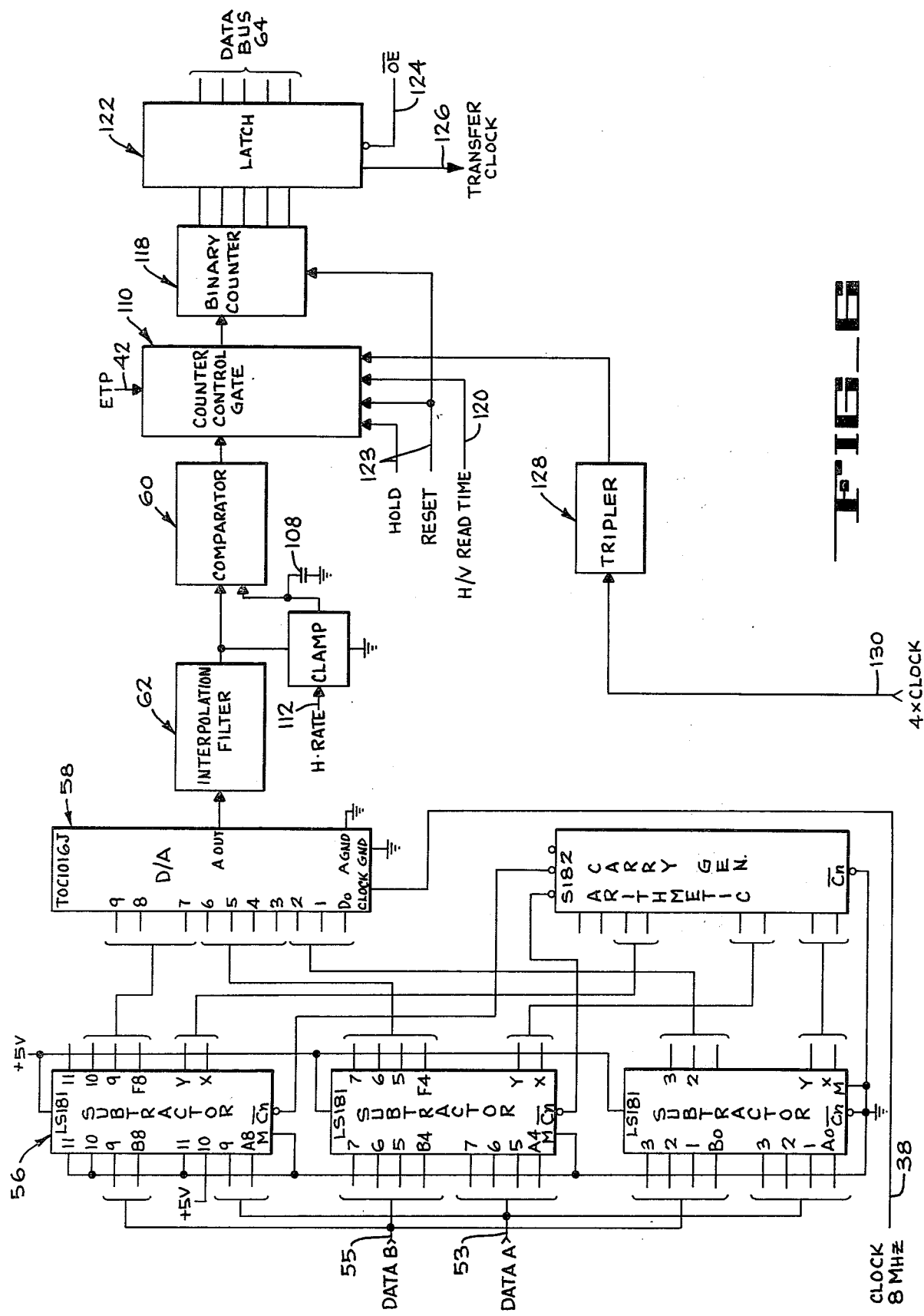

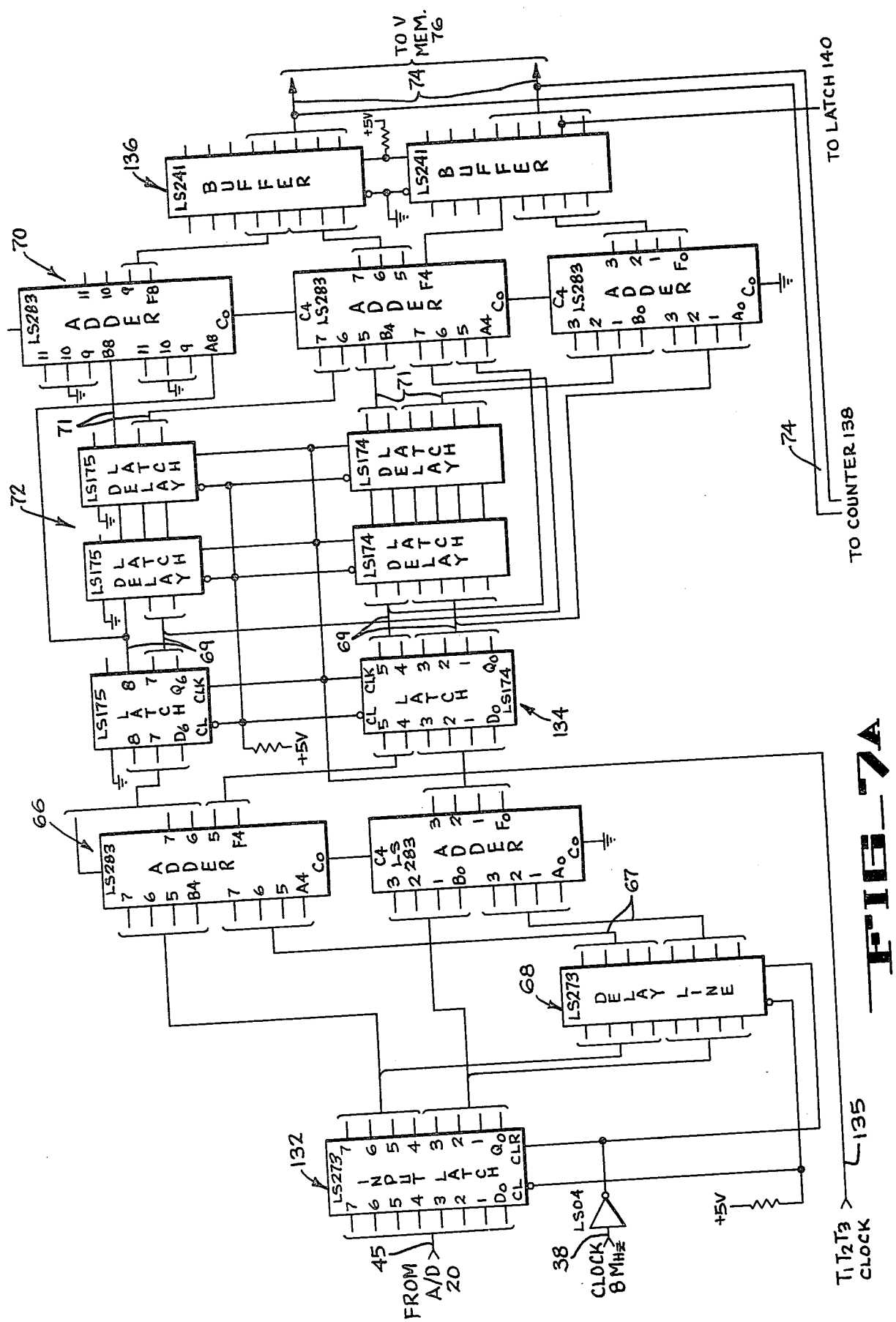
FIG_7A

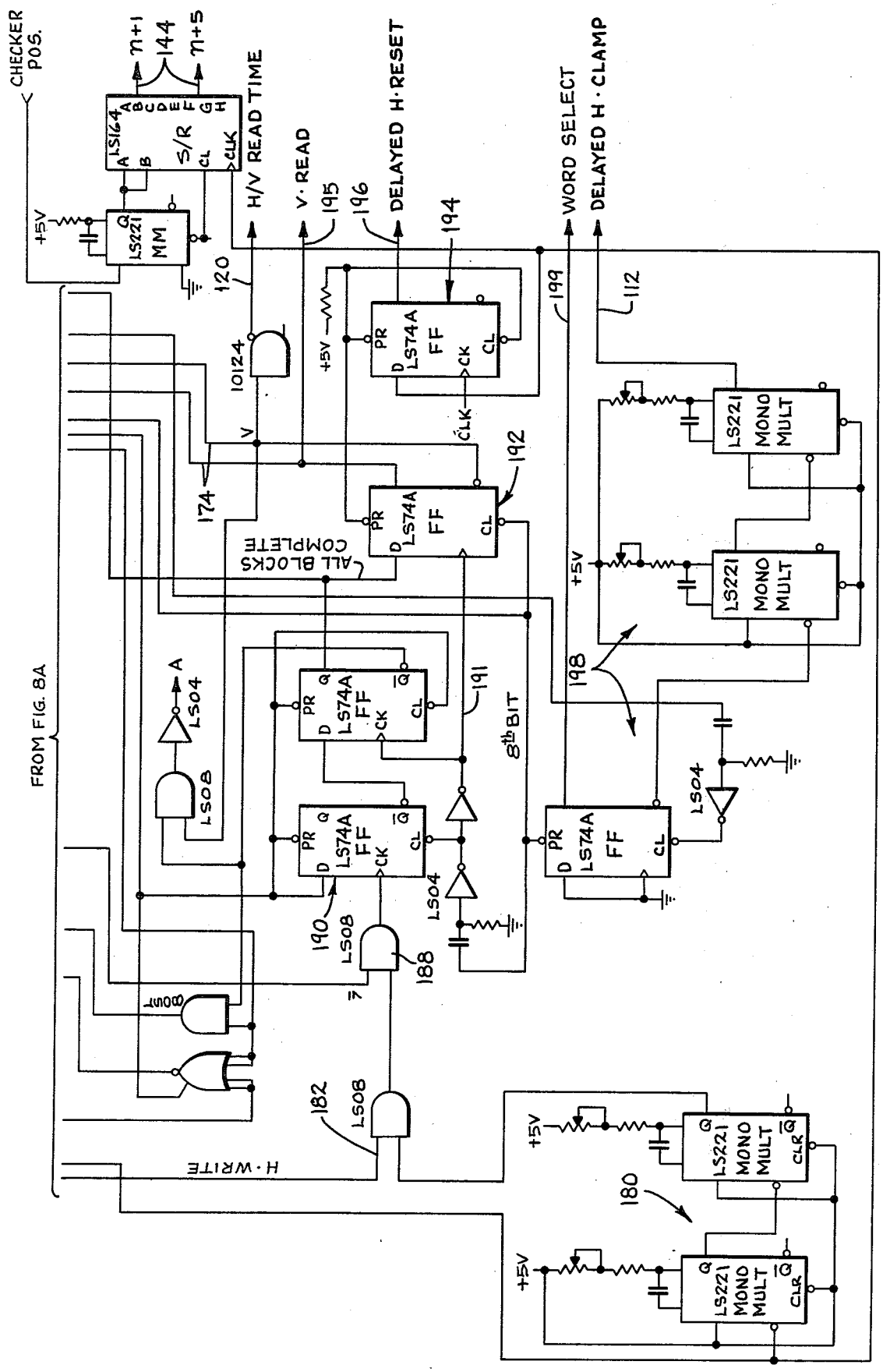

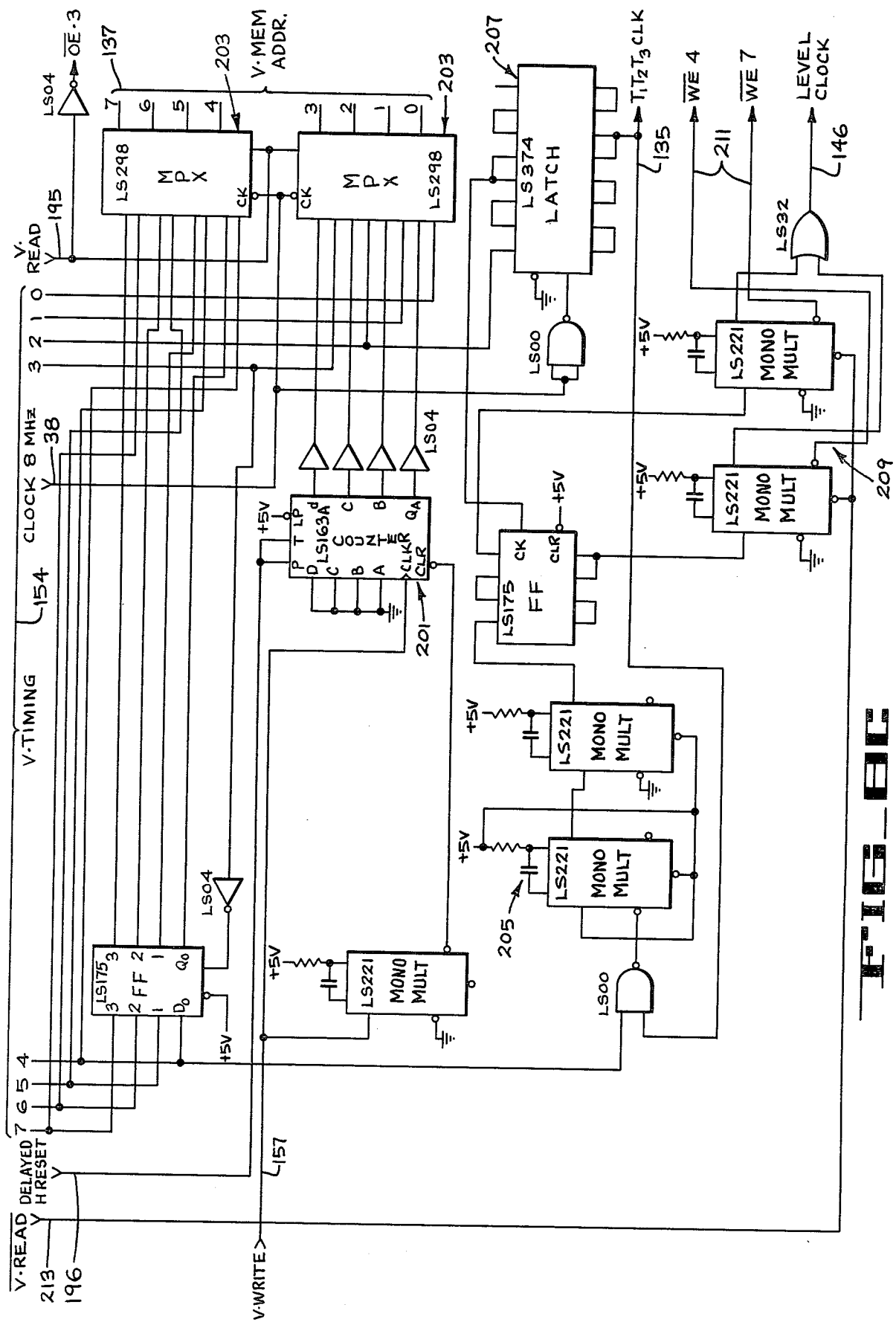

DIGITAL ERROR MEASURING CIRCUIT FOR SHADING AND REGISTRATION ERRORS IN TELEVISION CAMERAS

CROSS REFERENCE TO RELATED APPLICATIONS

A Total Raster Error Correction Apparatus and Method For the Automatic Set Up of Television Cameras and the Like, Ser. No. 124,370, filed Feb. 25, 1980, to E. F. Morrison and T. E. Zank, now U.S. Pat. No. 4,285,004.

BACKGROUND OF THE INVENTION

The invention relates to spatial/shading error correction systems, and particularly to automatic means for accurately measuring shading and registration errors via digital processing and storage techniques.

In television camera systems employing multiple pickup tubes, various spatial and shading error corrector circuits of varying complexity are used to detect any geometric scan errors due to time variations in the scan across a pickup tube, registration errors due to positional differences of the scan between tubes, and black and white shading errors, ie, video baseline drift and video level variations due to non-uniform output from the pickup tubes. In such systems, it is assumed that the geometric and registration (ie, spatial) scan errors may be corrected by adding a sufficient number of waveshapes such as sawtooth, parabola, etc, waveforms to the basic horizontal and/or vertical deflection waveforms. However, all spatial errors cannot be eliminated using the above techniques, since the scan errors only approximate the two orders of sawtooth and parabola waveforms commonly used for scan correction.

In addition, such corrector systems generally employ analog sources such as potentiometers, integrators, capacitors, etc, remotely-located from the camera head and thus coupled thereto via multiplexed parallel conductors in a cable. The analog error signals necessarily are encoded, multiplexed and decoded, thereby requiring considerable analog circuitry, which generates considerable drift and thus stability problems. The potentiometers continually must be read and re-adjusted, whereby the camera head is continually dependent upon the signals from the remotely-located system.

Typical of such prior art analog error detection and correction systems are those found in the Ampex Corporation broadcast color cameras models BCC-1, BCC-10, described in the Ampex "Service Data Package" Manual No. 1809326-01, Ampex Corporation, Redwood City, Calif.

A more recent and improved spatial and shading error measurement and corrector system is that of copending application to F. Morrison, et al, Ser. No. 124,370 filed Feb. 25, 1980, now U.S. Pat. No. 4,285,004, and assigned to the same assignee as this application. Here an improved analog error measurement system is employed to automatically detect existing spatial and shading errors in a camera system during a camera setup mode of operation, whereupon the errors are supplied to the camera head where they are digitally stored for subsequent use by the error correction circuitry thereof during the camera operating mode, independently of the error measurement circuitry. The system measures the spatial errors by providing optical and electronic test patterns. The optical test pattern contains a selected pattern of horizontal and vertical black and white lines corresponding to the electronic test pattern horizontal and vertical frequencies. The video signals of a master (green) pickup tube generated via the optical test pattern are compared with the electronic test pattern signal to provide master tube errors. Then the remaining (red/blue) slave tubes are compared with the master tube to provide the red/blue tube errors. Black and white shading errors are measured by comparing the amplitude of the video signal against selected black and white D.C. levels taken from the test pattern, with and without a cap on the camera lens.

The above analog error measurement system has to cope with the usual analog shortcomings; ie, video baseline drift and offset, use of a limiter for zero detection which eliminates all amplitude information of the video signal etc.

SUMMARY OF THE INVENTION

The invention combination overcomes the shortcomings of the prior art error measurement systems by providing digital means for accurately and reliably detecting spatial scan errors and video levels with only quantizing error limitations. To this end, the active video picture is divided into 13 equal horizontal (H) blocks and 14 equal vertical (V) bands of checkers. During an automatic setup mode, a multiplexer applies the desired signal (i.e., red, green, blue) from one of a possible plurality of cameras, to an A/D converter in the video path, and to a sync/electronic test pattern generator and pattern validation circuit in the timing/control signals path. An H adder/memory loop alternately stores and adds samples from selected lines (n, n+1, n+2, etc.) employing three memories. At line n+6 the sum of n+(n+1)+(n+2) is stored in one memory, and the sum of (n+4)+(n+5)+(n+6) is stored in another memory. The read cycle is initiated and the two sums are subtracted and the difference is D/A converted. The transitions and zero crossings are established via an interpolation filter and comparator, and the transitions are compared with the electronic test pattern signal to provide the H digital error data. The latter are stored in the camera head unit memory via a microprocessor data bus during the setup mode, for subsequent and independent use by the camera head unit during the camera operating mode.

The V measurements are made simultaneously, with the A/D converter feeding a serial pair of V adders/delay lines and two memories. The sum of two adjacent samples is applied from the first to the second adder/delay line. The latter adds the sum of two adjacent samples from the center of the first and second checkers of each block, to the sums of the center samples of the third and fourth checkers respectively, and the additions are stored in different memories. The procedure continues for every scan line through each checker band. During the read cycle, the memories are read during the scan line following the reading of the horizontal memories, using the same D/A converter, interpolation filter and comparator, to provide the V digital error data for storage during the setup mode, and subsequent use in the camera head unit during the camera operating mode.

Shading errors are provided from the vertical adders by adding the samples within each block when scanning a center line (n+1) in the upper half of a band of checkers, to the corresponding values when scanning a center line (n+5) in the lower half of the band. The sum is then divided by two to provide the average in the total block of the peak white and black video levels, which are stored with the H and V spatial error data.

BRIEF DESCRIPTION OF THE DRAWINGS

FIG. 1 is a block diagram depicting the invention combination.

FIG. 2 is a plan of an optical test pattern used in the error measurement process during the setup mode.

FIGS. 3A–3D is a graph depicting a band of checkers and equivalent analog waveforms of the data streams generated via the sampling process of the camera signals.

FIGS. 4, 5A, B, 6, 7A, B, and 8A, B, C and 9 are schematic diagrams depicting circuits of the block diagram of FIG. 1.

DESCRIPTION OF THE PREFERRED EMBODIMENTS

Figure 7B:
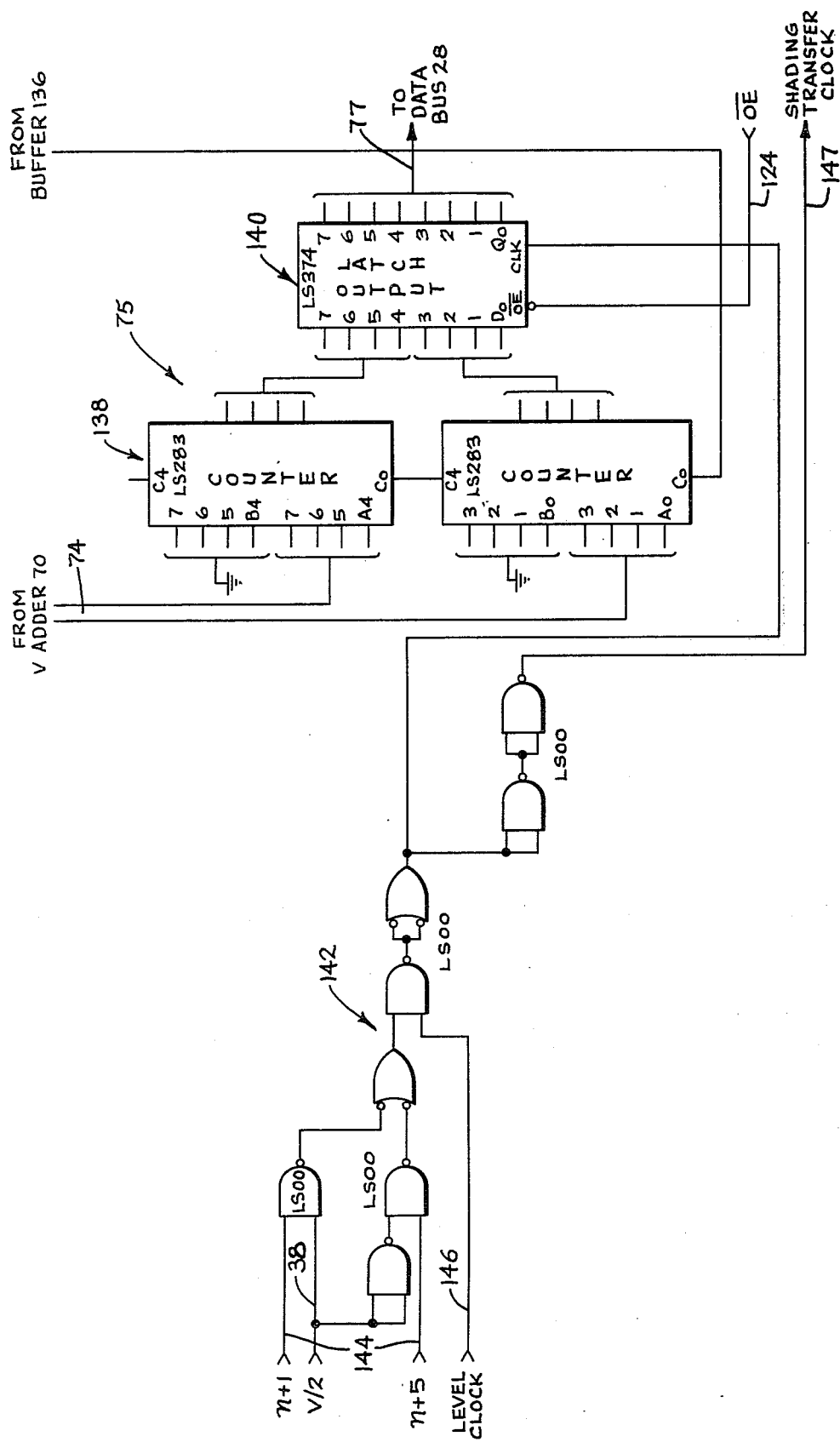

To provide the error measurements, the video picture, i.e., the picture scan raster, is divided into a preselected sampling pattern. More particularly, the horizontal lines are divided into 16 equal parts, herein termed "blocks", 13 of which are in the active picture area. The horizontal spatial scan error is thus integrated over the area of one block. In the vertical direction, the picture is divided into 14 parts, herein termed "bands" of "checkers", or checker bands. Each band is formed of two horizontal rows of checkers. Thus, the total matrix pattern of the active picture is 13 by 14 measurement points.

FIG. 2 depicts an optical test pattern which is employed within the camera, or as a chart in front of the camera, and which is scanned by the camera to provide the video test signal for setup purposes. The corresponding active picture area relative to the test pattern is depicted, as well as the (13) blocks, the (14) bands of checkers and the horizontal rows and vertical columns of checkers into which the active picture area essentially is divided. FIG. 3A also shows an enlarged view of two blocks of the (first) checker band depicting a series of scan lines, sample points, etc.

Referring to FIG. 1, an optical test pattern 10 such as shown in FIG. 2, is viewed by respective television cameras 12 during the setup mode of operation. The television cameras 12, are under microprocessor control via a camera switch line 14 from a microprocessor control/memory means 17, which selects one of the red, green or blue channels of the selected camera to allow measurement of the errors in each channel of the camera. The specific camera of the plurality is selected via a multiplexer control line 15, and is selectively coupled to a low pass filter/buffer circuit 16 via a multiplexer 18. The latter is part of the usual multiplex system used in camera systems to couple the camera head unit data, control, etc., signals to the microprocessor and to the camera control unit. An example of a complete television camera system is shown in the copending application Ser. No. 124,370 to Morrison et al, of previous mention. The low pass filter is of the linear phase type and prevents the generation of aliasing components in the analog-to-digital (A/D) process. The buffer is coupled via a line 19 to an A/D converter 20 in a video signal path, a sync generator 22 and pattern validation circuit 24 in a control/timing signals path, and also a locator detector circuit 26. The latter circuit 26 provides means for performing coarse error correction on the scan raster using a series of coarse registration locators 29 placed in the center, at either side, and at the top and bottom respectively, of the active video picture, FIG. 2. The locator detector circuit 26 includes detection and timing circuits and makes a coarse comparison of the locator 29 positions relative to an electronic test pattern signal, to correct for gross centering, size, bowing and skewing scan errors. The circuit 26 is coupled via a bus 30 to a data bus 28 which extends to the camera control unit microprocessor means 17, which performs the coarse scan correction measurements.

A clock/timing generator 32 is coupled via lines 33, to the sync generator 22 and thence via bus 35 to an electronic test pattern (ETP) generator 34. Generator 32 also is coupled via a clock bus 38 to a memory control circuit 36 and also provides clock/timing signals on the clock bus 38 for use by other components of the circuit. The ETP generator 34 provides an output to a monitor (not shown) via a line 40, and an ETP signal to the multiplexer 18 via a line 42. The ETP signal is an electronic test reference square wave signal of specific frequencies and perfect geometry. The memory control circuit 36 is also coupled via a line 43 to the pattern validation circuit 24, and provides various control signals on a control bus 44. Timing signals are fed to the locator detector circuit 26 and the sync generator 22 via the clock bus 38 from the timing generator 32.

The A/D converter 20 is coupled via a common sample data bus 45 to H and V error measurement channels of the video path, which channels operate simultaneously to generate the digital H and V error data. Converter 20 is clocked at an 8 MHz rate via clock line 38 and is coupled to an input A of an H adder 46, and thence via an output F and bus 47 to H memory means 48 formed of (three) memories 1, 2 and 3. Each of the memories may be selectively fed back to an input B of the adder 46 via a bus 49. Control signals are applied to the H adder 46 and H memory means 48 via the control bus 44 from memory control circuit 36.

The output data A and B of memories 1 and 3 are coupled to switch means 50 via buses 52, 54 respectively, which switch means also receive the digital data from the V channel as further described infra, and thus provides means for selecting either the H or V data. The switch means 50 provides the output data A and B corresponding to the inputs thereto from either the H or V channels. The output data are fed via buses 53, 55 to a subtractor circuit 56 which generates the digital difference A−B of the inputs. The difference is fed via a bus 57 to a D/A converter 58 and thence to an analog comparator 60 via an interpolation filter 62. The latter filter establishes the actual transitions and zero crossings of the converter 58 analog output signal with the comparator 60, as further described in FIG. 6. The comparator 60 also receives the ETP a respective from the generator 34 via the line 42, and provides the initial H and V digital error data to the data bus 28 and thus to the microprocessor control/memory means 17 via a bus 64 in response to the various timing and control signals on buses 38, 44.

The A/D converter 20 is also coupled via the sample data bus 45 to a V adder 66 and a delay latch 68 of delay time T1. The delay latch 68 also is coupled to the V adder 66 via bus 67 and is responsive to a 8 MHz clock on the clock line 38. The V adder 66 is serially coupled via a bus 69 to another V adder 70 and to another delay latch 72 of delay time 2T2. V adder 70 and the delay latch 72 are responsive to a clock on bus 44. The output of V adder 70 is coupled to the data bus 28 via a bus 74, a shading measurement circuit 75 and a bus 77. V adder 70 is also coupled to memory means 76 formed of (two) memories 4 and 5. The data outputs A and B of the memories 4 and 5 are fed to the switch means 50 of previous mention via buses 78, 80. Memory means 76 is responsive to the various control and timing signals on the control bus 44.

Briefly, in operation, the A/D converter 20 is clocked via the clock line at 38 at a rate 512 times the horizontal frequency, i.e., 8 MHz, and feeds the sampled data to the H adder 46, as well as to the V adder 66 and delay latch 68. With regards to the H error measurement channel, the H adder 46 is programmed via control bus 44 from the memory control circuit 36, (FIG. 8) whereby output F equals input A thereto, until a scan line being scanned (line n, for example) is validated by a validation strobe at the center of the fourth checker of a block, as depicted in FIG. 3A. Upon validation that valid data is being sampled, the strobe is generated via the pattern validation circuit 24 and the memory control circuit 36. The data sample A is stored in the memory 1, and the H adder 46 is programmed to $F=A+B$ via the control bus 44, whereby at line $n+1$ the values of lines n and $n+1$ are summed together and stored in memory 2. Similarly, in line $n+2$ the sum of $n+(n+1)+(n+2)$ is stored in memory 1. Line $n+3$ is skipped, and the routine is again initiated at line $n+4$ using memories 2 and 3. Thus, at line $n+6$, the sum of $n+(n+1)+(n+2)$ is stored in memory 1, and the sum of $(n+4)+(n+5)+(n+6)$ is stored in memory 3. Since the line at which the test pattern is validated may change from block-to-block due to spatial scan errors (tilt, bow, skew) a check is made at the end of the line $n+6$ to test if all blocks are advanced to the summation of three lines. This action also initiates the read cycle for the H memory means 48.

Thus at the line $n+7$, the data A and B in memories 1 and 3 are read through the switch means 50 into the subtractor circuit 56. FIGS. 3B, 3C depict the analog equivalent of the data streams A and B of buses 52, 54, wherein the dashed curves thereof depict the effect of shading errors. FIG. 3D depicts the curve of the difference A–B generated at the subtractor 56 output, wherein the level 0 is the true position of the test pattern transitions. Note that the shading effects are opposite in the waveforms A and B of FIGS. 2B, 2C and therefore, when the digital data are subtracted, the shading effects inherently are eliminated in the process.

The subtractor output is fed to the D/A converter 58 for conversion to the analog domain, and then to the interpolation filter 62 where the actual transition and the zero crossings of the analog signal are established. The transitions are then compared with the reference transitions in the ETP signal on line 42, via the comparator 60 in response to the various timing and control signals on the buses 38,44, as further described in FIGS. 6 and 8A, B, whereby differences therebetween represent (in this case) the initial H spatial scan error measured by the circuit. The H error is provided in digital form to the microprocessor control/memory means 17 in the camera system via the data buses 64 and 28, for subsequent use by the spatial error corrector circuit (not shown) during the camera operating mode. Examples of an error corrector circuit used in a camera head system for performing automatic spatial and shading error correction during the camera operating mode are depicted in the copending Morrison, et al, application of previous mention.

The vertical error measurement is made simultaneously with the horizontal error measurement. Thus, the sample data on bus 45 also are fed to the V adder 66 and to the delay latch 68. The present sample data are added by adder 66 to the prior sample data delayed by time T1, corresponding to a sample time. This sum of two adjacent samples is then fed to the V adder 70 and delay latch 72. The delay time 2T2 and the timing signals to adder 70 are selected such that the sum of the two adjacent samples from the center of the first checker of each block is added to the sum of the center samples of the third checker. The resulting addition is stored in the memory 4 of V memory means 76. Similarly, the sum of adjacent samples in the center of the second checker is added via V adders 66,70 to the sum of adjacent samples in the center of the fourth checker, and the result is stored in memory 5. This procedure is continued for every scan line through the duration of the checker band FIG. 3A.

Memories 4 and 5 are read in parallel during the first half of the scan line $n+8$, following the reading of the H sample data of the H memory means 48, using the same circuit as directed by the switch means 50. Thus, the subtractor circuit 56, D/A converter 58, filter 62 and comparator 60 perform the same functions on the V error data to supply the V spatial scan error data to the data bus 28 for storage in the microprocessor control/memory means 17, along with the H spatial scan error data.

The sum of the V adder 70, when divided by four, represents the average peak luminance level of the white and black checkers of the ETP, in one block during the scanned line. Thus, black and white shading error measurements readily are obtained by the same circuitry by adding the values of the center line $n+1$ in the upper checker row (FIG. 3A), to the corresponding values of the center line $n+5$ in the lower checker row, and dividing the sum by two. This provides an average in the total block of the peak white and black levels.

The described H/V spatial and shading error measurements are made during the setup mode by comparing the green channel against the test pattern to measure errors in the green channel and then storing any digital residual errors in the microprocessor memory as described above. Thereafter, the residual errors may be taken into account when the red and blue channels also are compared to the test pattern to obtain the red and blue channel errors. Thus measurements may be made of each channel using the wide-band video signal before encoding same, while still referencing red and blue channels to green, and using only one video cable to each camera head unit.

FIGS. 4–8 are schematic diagrams of an implementation of the block diagram of FIG. 1, wherein like components are similarly numbered. Thus in FIG. 4, the multiplexer 18 may select any one of a given number of cameras via the input lines 13 thereof, in response to a digital word from the microprocessor control via the camera switch lines 14. Although eight input lines corresponding to eight cameras are depicted herein, there is no restriction on the number of cameras that may be selected for use with the measurement circuit. The only concession is that added measurement time is required for additional cameras.

Upon selection of a specific camera, the video output therefrom is applied via the multiplexer 18 to a video amplifier 82 which, in turn, drives the low pass, linear phase filter/buffer 16, which provides roll off of the input signal, and maintains the zero crossings of the incoming video signal. A test switch 84 couples the filter 16, i.e., the amplifier 82, to either the video signal via the multiplexer 18, or to the electronic test pattern (ETP) via a line 42, in response to a test switch signal on a line 88 extending from the microprocessor. The test switch signal on 88 is used to automatically calibrate the error measuring circuit prior to the setup procedure whereby, in response to the microprocessor, the ETP signal is fed into the circuit at the switch 84 and any circuit generated errors due to long term drift etc, are stored in the memory of the microprocessor means 17.

Figure 9:
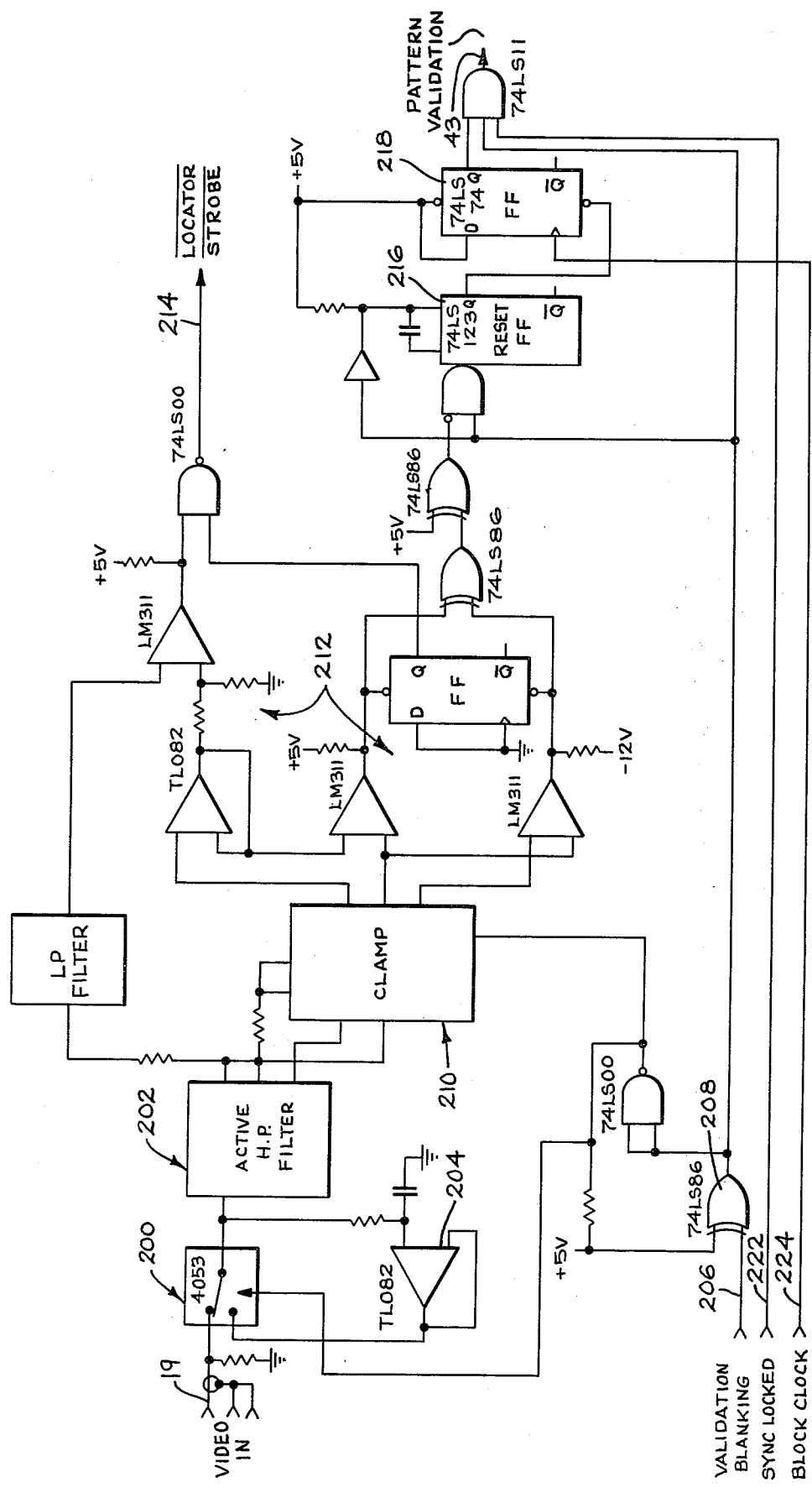

A times-2 video amplifier 90 is coupled to the filter 16 and supplies the video signal, indicative of a valid incoming signal, to the pattern validation circuit 24 of FIG. 9 via the line 19. The amplifier 90 is also coupled to an input driver 94 of the A/D converter 20, and to a second video amplifier 96 which supplies the signal to the sync generator 22 (FIG. 4) and, more particularly, to a sync stripper or slicer circuitry 98 thereof on line 92. The slicer 98 provides a control signal in the form of an extracted timing signal back to the video amplifier 82 on a line 99 for DC restoration. The sync generator 22 also includes a sync processor circuit 101, which provides the output signals of previous mention to the clock and timing generator 32, on line 33, i.e., the camera vertical and horizontal sync signals for the clock-/timing generator 32, and the framing information signal V/2 for the shading measurement circuit 75 of FIG. 7B and for microprocessor control. The sync generator 22 is provided with the vertical blanking signal via a line 100. A 512×H-sync signal, i.e., an 8 MHz clock, is provided via a line 102 of clock bus 38, which is coupled to the clock inputs of the A/D converter 20 and its associated buffer 104. The A/D converter 20 provides the sampled data at the 8 MHz rate on the A/D output bus 45. The times-2 video amplifier 90 provides approximately a 1 volt sync amplitude output for the clamping pulse of the sync stripper circuit 98 and for the DC restoration level such that blanking occurs, for example, at bit 28, and the white level occurs at bit 228, thus spanning 200 bit levels between blanking and the white level. It follows that the resolution of the least significant bit is one-half percent by definition, wherein the quantizing level is thus one-half percent, providing relatively accurate sampling.

Since each camera at the input to the circuit 98 is gen-locked to a respective, and different, master clock, the sync stripper circuit 98 is employed to strip the incoming video from each camera signal to insure that the error measurement circuit is locked to the specific camera being measured.

Referring to FIGS. 5A, B, the H adder 46 receives the continuous data stream via the bus 45 and an input latch 106. At the start of the setup mode, the data is sampled from the first scan line n, FIG. 3A, the addresses are generated, and the data are stored in memory 1 of the H memory means 48. Upon completion of the first scan of line n, the memory 1 contains 16 blocks of data samples, in which 13 blocks are in the active video i.e., 512 samples. Each block is made up of 4 checkers as shown in FIG. 3A, and at the end of each block, i.e., in the center of the fourth checker, a validation strobe is made to verify that the scan is accurately scanning the checker pattern, i.e., the optical test pattern 10 of FIGS. 1, 2 and 3A. At the center of the fourth checker in each block the validation strobe essentially asks if the data received is valid. If affirmative, for example, on a line n, then on line n+1, the H adder 46 is re-programmed from F=A to F=A+B, as previously described in FIG. 1, to thereby validate the respective data in the H memory means 48.

The control signals from the memory control circuit 36 are fed to the H memory means 48 via the control bus 44, which addresses and recalls the prior sample data of line n from memory 1, supplies the data via the bus 49 to the H adder 46, adds the line n+1 data to the prior line n data, and stores the sum in the memory 2. The cycle continues with line n+2, wherein the sum of the two previous lines is recalled from memory 2 via the bus 49, is added to the incoming data of line n+2, and is subsequently stored in memory 1 of H memory means 48.

The sequential summation of successive lines of horizontal data is performed to integrate the data into the vertical direction, in order to enhance the detection and thus the accuracy of detecting the transitions of the incoming video signal, which during camera setup are the camera test signals. Averaging 3 successive data values together effectively causes an average over 3 successive scan lines, thus enhancing the signal-to-noise ratio.

The fourth scan line n+3 is then skipped since it is in the area of the vertical transition and is thus not dependable data. In the fifth scan line n+4, the sampled data is recorded in memory 3 of the H memory means 48 as previously described for memory 1 and line n. Thereafter, the data n+4 is recalled from memory 3 during scan n+5 and is summed with the data from line n+5. On scan line n+6, the summed data of lines n+4 and n+5 are added to the incoming sample data, and the summation of the 3 lines is stored in memory 3.

After all blocks in a band (two rows of checkers) have been scanned, and upon generation of the verification, an H memory read, i.e., output enable (OE) and a No. 7 signal, are supplied to H memory means 48 via bus 44 and a line 170 from the memory control circuit 36. The pertinent H addresses are supplied on address bus 156, the stored data A and B in memories 1 and 3 are read during the horizontal line n+7 and, are supplied to the switch means 50 via the A and B data buses 52, 54. The switch means 50 (FIG. 5B) includes a multiplexer latch fed by the controlled outputs of the memories. A word select signal on the line 199 from the memory control circuit 36 (FIG. 8B) enables the switch means 50 (FIG. 5B) to supply the data A and B at the 8 MHz clock rate to the subtractor 56 of FIG. 6, via data buses 53,55 respectively. Data B is subtracted from data A by the subtractor 56, which corresponds to subtracting analogous analog waveform B from waveform A (FIGS. 3C, B respectively) which provides the digital difference data A-B corresponding to the composite analog waveform A-B of FIG. 3D. The resulting difference data contains the signal zero crossings commensurate to the transitions from the black/white, white/-black, etc., checkers of the test pattern.

Since spatial registration measurements are done prior to shading error measurements, the shading errors will normally affect the results of the spatial error measurements. However the shading errors which are included in the digital data A, B, as represented by the dashed analog curves in FIGS. 3B, 3C respectively, cause the same erroneous affect on each of the data. Thus, the process of subtracting the complimentary data inherently compensates for existing shading errors to provide the digital difference word corresponding to the analog waveform A-B with transitions and crossover points which are uneffected by the shading errors.

A fixed digital number is added to the difference data A-B via the most significant bit of the data A input of the subtractor 56 (FIG. 6), and the result is fed to the D/A converter 58 which is clocked by the 8 MHz clock, and the resulting analog waveform is fed to an interpolation filter 62 which accurately detects the zero crossings corresponding to the transitions between the successive checkers of the test pattern. The zero crossings established by the interpolation filter 62 are then fed to the comparator 60. A reference capacitor 108 in the comparator 60 provides the reference for the zero crossing during the horizontal interval, in response to applying zeros to all the inputs of the subtractor via the word select signal on line 199. The reference capacitor 108 is charged in response to an H-rate signal via a switch and a line 112, to maintain the zero crossing reference for each scan line.

As seen in FIG. 6, the comparator 60 is coupled to the data bus 64 of previous mention, via a counter control gate 110, a binary counter 118 and an output latch 122. The latter components 110, 118 and 122 provide one means for generating and counting pulses indicative of the time difference between the occurrence of the output signal of the comparator 60 and the ETP signal on line 42, previously discussed in FIG. 1. The components 110, 118, 122 merely perform their conventional function. Thus counter control gate 110 controls the counter 118 in response to the hold and reset signals and the H/V read signal on lines 123 and 120, as clocked via the 96 MHz clock from a tripler circuit 128 and 4×clock signal on line 130 thereto. The lines 123, 120 extend from the memory control circuit 36 as described in FIGS. 8A. 8B. The binary counter 118 counts transitions to provide the H and/or V error data, which is then fed to the bus 64 via the output latch 122 in response to the output enable (oe) signal from the microprocessor on the line 124, in the same and generally conventional manner as described in the shading circuit of FIG. 7B. The transfer clock on line 126 conventionally informs the microprocessor of the data availability, as discussed below in FIG. 8A.

The digital data indicative of the spatial errors are fed to the microprocessor control/memory means 17 via the microprocessor data bus 28 and are stored in a temporary memory therein for subsequent storage and use by the error correction system during the camera operating mode in a manner analogous to that described, for example, in the copending Morrison et al application of previous mention.

Regarding now the vertical measurement process and referring to FIG. 7A along with FIGS. 5, 6, the A/D converter 20 provides the sample data, via the bus 45, to an input latch 132 which is clocked at the 8 MHz rate. The latch 132 is coupled to the delay latch 68 and to the V adder 66. Delay latch 68 provides a time delay TI of one sample, and feeds the delayed sample to the V adder 66 via the bus 67. The V adder sums the delayed and the present data, and the result is fed to the V adder 70 and the delay latch 72, via a latch 134. The latch and delay latch 72 are clocked via a T1, T2, T3 clock on a line 135 from the memory control circuit 36. The delay latch 72 provides a time delay of twice a checker width, i.e., provides a 2 microsecond delay to the incoming summed adjacent samples, and feeds the delayed sum to the V adder 70 via the bus 71 for summation with the next incoming pair of summed samples. A centered pair of summed adjacent samples are selected via the T1, T2, T3 clock on line 135, as depicted in FIG. 3A, to insure that the pair of samples are taken from the centers of the black and white checkers. The V adder 70 latches the center sample sums at its input via the latch 134, whereupon the present and delayed sums are added by the adder 70. Thus the output of the V adder 70 is the sum of four sample pairs, where each sample pair has been taken from the center of a checker. That is, one pair of sample pairs is the sum of two pairs of adjacent center samples from two successive white checkers, while the second pair of sample pairs is the sum of two pairs of adjacent center samples from two successive black checkers. The data from the white checkers are stored in memory 4 of the V memory means 76, and the data corresponding to the black checkers are stored in the memory 5. The corresponding V memory address are supplied via a bus 137 from the memory control circuit 36 of FIG. 8C.

Since the procedure is repeated line by line, the resulting data stored in the V memory means 76 contains the transition information obtained by crossing the rows of checkers in the vertical direction. That is, the sums of the samples in, for example, memory 4 represent a transition white-to-black in the vertical direction, while the samples of the memory 5 represent transitions from black-to-white, within a checker band. Blooming and optical crosstalk which occur in the transition from a white to a black checker along one vertical column of the checkers, is compensated for by the transition from white-to-black checkers in the adjacent vertical column of checkers. The compensation is performed by the subtraction process of previous description, wherein erroneous variations in transition positions due to blooming and crosstalk are such that subtraction of the data via the subtractor 56 cancels the effects thereof, in the manner described above relative to the cancellation of the shading effects.

The output of the V adder 70 is fed to the V memory means 76 as previously described, via a buffer 136 and a bus 74. The output from memories 4 and 5 are fed as data A and B to the switch means 50 via buses 78, 80 respectively. The switch means 50 thus provides for the time sharing of the data A and B from the H and V memory means 48, 76 respectively. The vertical spatial measurement data is handled in the same manner by the measuring circuitry following the switch means 50, as previously described relative to the measurement process for the horizontal spatial error data. Use of the switch means 50 and the following circuitry circumvents the need for duplicate circuitry.

As previously mentioned, the H spatial error data are read from the H memory means 48 following the 8th scan, ie, during the n+7 scan line. Immediately thereafter, during the first half of the 9th horizontal line (n+8), the V spatial data are read from the V memory means 76 in response to an output enable (OE) signal, and the select (H-clamp) request on the line 199, from the memory control circuit 36, FIGS. 8A,B. During the last half of the line n+8 and continuing on through subsequent scan lines of successive checker bands, the cycle of sampling and summing the H and V data samples continues as previously described for both the horizontal and vertical spatial error measurements. The validation circuitry again verifys that the camera is properly scanning each subsequent band of checkers, and that each cycle of eight scan lines corresponding to a band is beginning.

Referring to FIG. 7B, the output from the V adder 70 is also introduced via the bus 74 to the shading measurement circuit 75, and particularly to an adder 138 and a tri-state output latch 140 coupled thereto. The output latch 140 is clocked via a gate circuit 142 during the scanning of the lines n+1 in the odd fields and n+5 in the even fields, in response to n+1 and n+5 control signals thereto on lines 144, a level clock on line 146 from FIG. 8C, and the V/2 framing signal from the sync generator 22 via clock line 38. The level clock is a continuous clock which is gated via gate circuit 142 to provide the shading transfer clock which indicates to the data bus 28, when shading error data is available. The adder 138 performs a divide-by-four function by shifting bits, wherein the zero and the 1-bit are dropped, with the 1-bit from the V adder 70 added into the carry-in input of the adder 138 to provide for rounding off. The tri-state output latch 140 feeds the shading error data to the microprocessor data bus 28 via a bus 77 in response to the microprocessor output enable request on the line 124. A transfer clock on a line 147 from the gate circuit 142 informs the microprocessor means 17 when to transfer the data and which field of, for example, a two-field NTSC television standard is being scanned, since the sequence in field 1 will be white/black and in field 2 will be black/white. In response to the transfer clock on line 147, the microprocessor adds the proper data to provide the black/white shading errors.

The shading errors are thus relatively easily acquired since the V adders 66 and 70 provide the sum of four samples from two successive white checkers, and four samples from two successive black checkers for each half block, ie, for each row of checkers in a block. Since the center sample pairs, which comprise the output of the vertical adders, are already averaged to provide the vertical error data, they are used to provide the shading errors by dividing the data by four and then rounding off. As noted, the shading error data are measured in the center lines of each half of the band of checkers, ie, on scan lines n+1 and n+5, to minimize interference from the vertical transition between the rows of checkers.

Figure 8A:
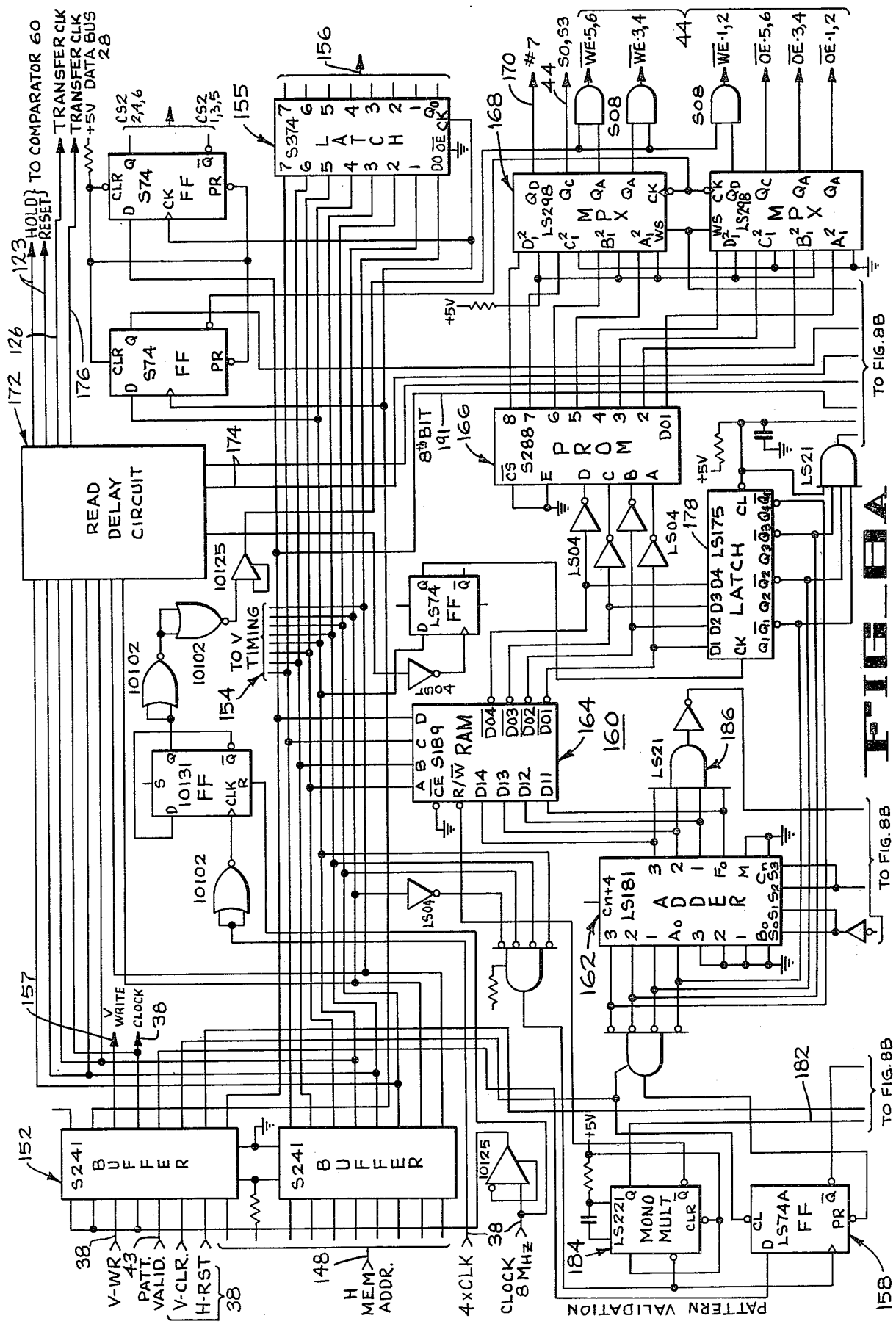

The memory control circuit 36 of FIG. 8 provides the means for timing, clocking and otherwise controlling, the various components of the error measuring circuit of description herein. The FIGS. 8A, 8B includes inter alia the control circuits for the H memory means 48, while the FIG. 8C includes V memory means 76 control circuits.

Thus the H memory means addresses are generated by the clock/timing generator 32 in response to the signals fed thereto, which addresses are fed to an input buffer 152 of the memory control circuit 36, via an H address bus 148 and various control signals on input lines 38. The outputs from the buffer 152 provide V memory timing signals via a bus 154 which extends to the FIG. 8C, and also provide H memory addresses via a latch 155 and the H address bus 156 which extends to the H memory means 48. The buffer 152 also provides the 8 MHz master clock on the clock line 38 of previous mention, and a V-write output on a line 157 which couples to the V memory control portion of FIG. 8C.

The pattern validation signal from the circuit 24 of FIG. 9 is supplied to the buffer 152 via the line 43 and thence to a D flip-flop latch 158. The latter latches at the center of the fourth checker of each block, at such time as the validation signal indicates valid data. An H-status control circuit 160 includes the adder 162, which is essentially a counter which stores the number of scans in a RAM 164, after the initial pulse for each block of data. The validation line 43 is strobed during the 4th checker of each block to determine if the block data is valid.

The adder 162 is coupled to a random access memory (RAM) 164, and is either programmed to zero, or is incremented via the latch 158. The RAM 164 stores the line status for each block and determines the output of a programable read only memory (PROM) 166. The RAM 164 controls the PROM 166 which supplies the respective control signals (write/read enable) corresponding to the specific memories being written into, or read out, via a two-input multiplexer latch 168 and the respective lines of the control bus 44. A line 170 from the multiplexer 168, provides the No. 7 signal, indicating the 8th scan line, which is fed to the H memory means 48 to initiate the H read cycle. The RAM 164 is also coupled back to the inputs to the adder 162 via a quad D-type flip-flop 178, which provides the data A input to the adder 162.

The buffer 152 also provides inputs to a read delay circuit 172, formed of a series of shift registers, or a PROM, etc., which compensates for various delays in the analog portions of the H and/or V error measurement circuitry, i.e., the interpolation filter 62. To this end, the 8 MHz clock on the clock line 38 is coupled to select inputs of the buffer 152 and thence to the read delay circuit 172. The latter delays the incoming signals also in response to H and V inputs on lines 174, such that hold and reset signals are provided at various clock intervals, on the output lines 123 which extend to the comparator 60. The read delay circuit 172 also provides a transfer clock to the data bus 28 via a line 176, and another transfer clock to the comparator 60 via the line 126.

Referring also to FIG. 8B, a pattern window circuit 180 inhibits an H-write pulse received on line 182 from the H memory address via a monostable multivibrator 184, any time other than during the active picture scan time. An H-status detector 186 detects when the adder 162 has advanced to a 7 output, and sets a logic level at the output of an AND gate 188. Thus when the 7 is detected, it blocks the H-write pulse to clock a flip-flop 190. The latter is cleared at the beginning of horizontal sync, ie, at the start of each line scan. If a 7 blocks the H-write pulse, the flip-flop 190 stays clear for the complete horizontal line. The status at the end of the line is re-strobed via line 191, and if clear for the whole scan line, is an indication that each block along the line has achieved the value of 7. This initiates the H read process via a logic level to the multiplexer latch 168, which switches from the PROM 166 data to a fixed read condition, for the particular line. After the H read process is accomplished during one scan line, a flip-flop 192 is set via the clock on line 191 from the H memory address. The flip-flop 192 changes state to cause the read delay circuit 172 to switch the lines 123 from H read to V read. The flip-flop 192 also provides the H/V read time signal on the the line 120 to the counter control gate 110 of FIG. 6. A V-read signal from flip-flop 192 and a delayed H-reset from a flip-flop 194, also are supplied to the V portion of the memory control circuit, FIG. 8C, via lines 195, 196. Thus the V-read signal initiates the V read process for half of the line n+8 immediately following the H read process on line n+7.

Word select 199 and delayed H-clamp 112 signals are provided by circuit 198, in response to the bit-8 pulse on line 191. The word select on line 199 is coupled to the switch means 50 and switches all data lines to a logic 0. The delayed H-clamp is coupled to the comparator via a line 112 and provides means of charging the capacitor 108 to the reference level.

In FIG. 8C, the delayed H-reset on line 196 starts counter 201, which is clocked by the V-write command from the buffer 152 on line 157. V write establishes a window across each checker band, which begins four scan lines before the band, and ends four lines after the band. Thus reading of the counter 201 starts four lines before a checker band and the delayed H-reset advances the counter 201 by one at the beginning of each line. This generates interlace V memory means addresses, wherein the data storage positions in the V write mode are in spans of 16, between each clock pulse. In each successive line, the data is filled in between the initial data, as controlled by the counter 201. A multiplexer 203 is clocked by clock line 38 and outputs the V memory addresses to the V memory means 76 via the V address bus 137.

A flip-flop circuit 205 and associated circuitry receives a bit-4 signal from the V timing bus 154, and generates the T1, T2, T3 clock, which is fed to the V adder of FIG. 7A via a latch 207 and the line 135. A pair of monostable multivibrators 209 are coupled to the flip-flop circuit 205, and generate the inverted write-enable commands for the V memory means 76 on lines 211, in response to an inverted V read command on a line 213. The multivibrator 209 also generates the level clock on line 146, for the shading measurement circuit 75 of FIG. 7B.

FIG. 9 depicts an inplementation of the pattern validation circuit 24 of FIG. 1, wherein the camera video signal, which is used to provide the pattern validation signal, is fed to a switch 200 via the line 19, and thence to an active high pass filter 202 and a detector 204. The former separates the 500 MHz component from the video signal, while the latter detects the average DC level of the validation signal and clamps thereto via the switch 200 in response to an exclusive OR gate 208 and a validation blanking signal on a line 206. The validation blanking signal is slightly wider than the normal system blanking interval and blanks out sync and black values during the blanking interval. To this end, the filter 202 is coupled to a clamp circuit 210, which, in response to the validation blanking signal on the line 206, eliminates the composite sync V components in the video signal during the sync and blanking intervals, to maintain the DC level. The clamp circuit 210 is coupled to thresholds 212, which provide the reference level to determine whether the test pattern is being scanned properly. One threshold provides a locator strobe signal on a line 214 which is used to transfer horizontal and vertical coordinates to the microprocessor means 17. The microprocessor compares the coordinates with the reference coordinate of the ETP to effect a coarse registration via the system microprocessor means 17, prior to performing the precise registration and shading measurements via the error measurement circuit of description herein.

The thresholds 212 also are coupled via exclusive OR gates to a resetable one-shot flip-flop 216, and thence to a second one-shot flip-flop 218. The latter provides the pattern validation signal on a line 43 in response to the validation blanking signal on the line 206, and to a block clock on a line 224. More particularly, the block clock generates a window for each block. At the beginning of a block, the one-shot 218 is strobed high, and looks at the one-shot 216, which generates a 25% wider pulse than that of the block clock and which is triggered at every checker transition in the test pattern. The flip-flop of the memory control circuit 36 strobes the pattern validation line 43 in the middle of the fourth transition (FIG. 2A). If every transition in a block is detected, the output of the one-shot 218 is high during the third to the fourth transition, indicating a valid scan and data. If a transition is missed, one-shot 216 is reset, and the output of one-shot 218 goes low, indicating that the scan in not valid.

The pattern validation signal on line 43 is fed to the buffer 152 of the memory control circuit 36 and is used by the latch 158 and the H-status control circuit 160 to provide the various control signals (ie, write/read enable for the specific memories 1 through 5, etc.) of previous description, on the control bus 44.

I claim:

1. A circuit for measuring H and V spatial and shading errors existing between a video test signal generated by a pickup tube of a television camera head and an electronic test pattern signal of perfect geometry, comprising the combination of;
   means for receiving the video test pattern signal and for digitizing therefrom digital data A and data B corresponding to summations of selected digital samples of the video test signal which contain shading error effects;
   memory means coupled to the means for receiving and digitizing for selectively storing the digital data A and data B;
   means coupled to the memory means for selectively subtracting data A and data B to provide digital difference data without the shading error effects; and
   means coupled to the means for subtracting and to the electronic test pattern signal for comparing the digital difference data with the electronic test pattern signal to provide the spatial error information.

2. The circuit of claim 1 including;
   shading error measurement means coupled to the memory means for receiving the data A and data B and for providing an average value thereof corresponding to the white and black shading errors.

3. The circuit of claim 1 wherein the means for comparing includes;
   filter/comparator means for generating initial transition error data corresponding to the digital difference data;
   microprocessor/memory means coupled to the filter/comparator means and to the electronic test pattern signal to provide the spatial error information.

4. The circuit of claim 3 wherein;
   the memory means includes H adder/memory means and V adder/memory means coupled to the means for digitizing for providing respective H data A and data B, and V data A and data B.

5. The circuit of claim 4 wherein;
   the subtraction means digitally subtracts the H data B from the H data A, and the V data B from the V data A, to provide H difference data A-B and V difference data A-B respectively.

6. The circuit of claim 5 wherein;

the H adder/memory means sums selected samples from pairs of successive scans of the video test signal to provide the H data A and data B.

7. The circuit of claim 6 wherein the pickup tube generates a video active picture area corresponding to an active area of the test pattern, wherein;
the active picture area and the test pattern is divided into a selected plurality of blocks in the horizontal direction, each block including a plurality of alternate white/black checkers, and into a plurality of checker bands in the vertical direction, each band including rows of the alternate white/black checkers;
the H adder/memory means sums selected samples from two successions of scan lines within a block and retains the pair of summations as the H data A and H data B respectively in separate memories therein; and
the V adder/memory means adds two pairs of selected samples from white checkers within a block to provide V data A, and adds two pairs of selected samples from black checkers within the same block to provide V data B, and retains the V data A and V data B in separate memories therein.

8. The circuit of claim 7 further including;
shading error measurement means coupled to the V adder/memory means for receiving the V data A and V data B prior to storage in the memories, and for providing an average of selected lines of samples thereof within a block of the peak white and black video levels corresponding to the shading errors.

9. The circuit of claim 7 further including;
pattern validation means coupled to the video test signal for providing a validation strobe indicative of valid data generation within selected blocks.

10. The circuit of claim 7 wherein;
the H adder/memory means includes three H memories and sums samples within a block from a first succession of scans along a checker band and stores the summation as H data A in the first H memory, and also sums samples within the same block from a second succession of scans along the same checker band and stores the summation as H data B in the third H memory; and
wherein the H data A and H data B are read out from respective memories for application to the subtraction means upon completion of the second succession of scans.

11. The circuit of claim 7 wherein;
the V adder/memory means includes two V memories and respective delays operating simultaneously with the H adder/memory means, and adds the sum of adjacent center samples from a first white checker with the sum of adjacent center samples from a second white checker and stores the addition as V data A in the first V memory, and also adds the sum of adjacent center samples from a first black checker with the sum of adjacent samples from a second black checker and stores the addition as V data B in the second V memory; and
wherein the V data A and V data B are read out from respective memories for application to the subtraction means upon completion of the H data A/B read out process.

12. The circuit of claim 7 wherein the filter/comparator means further includes;
interpolation filter means coupled to the subtractor means for providing and establishing the precise transitions of the difference data A-B corresponding to the checker transitions and comparator/counter means coupled to the interpolation filter means for providing a reference zero crossing and for generating an initial transition error for application to the microprocessor/memory means.

13. The circuit of claim 12 wherein multiple camera head units are being setup, including;
multiplexer means for selecting a camera head unit in response to a camera select command; and
filter means for preventing the generation of aliasing components coupled between the multiplexer means and the means for digitizing.

14. The circuit of claim 13 further including;
control means responsive to the video test signal for generating video signal-related clock and timing signals; and
memory control means coupled to the control means and to the pattern validation means for generating timing controls and addresses for the sample summing processes of the H and V adder/memory means.

15. A measurement circuit for measuring spatial and shading errors existing between an electronic test pattern of perfect geometry and a video test signal generated by the pickup tubes of a television camera system which includes multiple camera head units and a microprocessor control with memory, comprising the combination of;
H and V memory means for storing selected data A and B of respective sums of H and V digital samples of the video test signal, which data A and B contain shading error effects;
means for selectively subtracting the data A and B of the H digital samples, and of the V digital samples to generate respective H and V difference data in time-shared selection which has no shading error effects; and
means including the microprocessor control with memory for selectively comparing the H and V difference data with the electronic test pattern to determine the respective H and V error data corresponding to the errors existing between the pickup tube scans and the electronic test pattern.

16. The circuit of claim 15 further including A/D converter means coupled to the video test signal to provide the H and V digital samples corresponding thereto;
H and V adder means coupled to the A/D converter and integral with respective H and V memory means for selectively summing and storing the H data A and data B, and V data A and data B;
said subtractor means being selectively coupled to the H adder and memory means, and to the V adder and memory means;
D/A converter means coupled to the subtractor means to generate H and V analog difference signals corresponding to the H and V difference data; and
means coupled to the D/A converter means for detecting and establishing the transitions in the H and V analog difference signals, wherein the microprocessor control causes the subsequent comparison thereof with the electronic test pattern transitions.

17. The circuit of claim 16 further including;

timing control means coupled to the video test signal for generating clock and timing signals related to the video test signal;

pattern validation means coupled to the video test signal for providing a validation strobe indicative of valid data generation; and memory control means responsive to the timing control means and to the pattern validation means for generating timing controls and addresses for the sample summing processes of the H and V adder and memory means.

18. The circuit of claim 17 further including;

data switch means for selectively providing the H data A/B or the V data A/B to the subtractor means;

interpolation filter means coupled to the D/A converter means to establish the transitions in the H and V difference signals; and comparator/counter means coupled to the interpolation filter means and thence operatively coupled to the memory of the microprocessor control.

* * * * *